United States Patent
Eichholz et al.

(10) Patent No.: US 7,740,201 B2
(45) Date of Patent: Jun. 22, 2010

(54) DEVICE AND METHOD FOR FLOOR HEATING IN AN AIRCRAFT

(75) Inventors: Johannes Eichholz, Hamburg (DE); Johannes Bruns, Fiesoythe (DE); Philipp Autenrieth, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 235 days.

(21) Appl. No.: 10/582,700

(22) PCT Filed: Dec. 30, 2004

(86) PCT No.: PCT/EP2004/014857

§ 371 (c)(1),
(2), (4) Date: Jun. 13, 2006

(87) PCT Pub. No.: WO2005/063570

PCT Pub. Date: Jul. 14, 2005

(65) Prior Publication Data

US 2007/0125908 A1 Jun. 7, 2007

(30) Foreign Application Priority Data

Dec. 30, 2003 (DE) ................. 103 61 655

(51) Int. Cl.
*B64C 1/20* (2006.01)
*B64C 1/14* (2006.01)

(52) U.S. Cl. ............... 244/118.3; 244/129.5; 244/118.1

(58) Field of Classification Search .......... 237/43, 237/12.3 A, 69; 392/307, 435; 244/118.1, 244/118.5, 129.1, 118.6, 118.2, 118.3, 129.4, 244/129.5, 117 A; 454/76, 77, 74; 165/43, 165/42, 235, 56, 53
See application file for complete search history.

(56) References Cited

U.S. PATENT DOCUMENTS 2,799,481 A * 7/1957 Becker ................. 165/171

(Continued)

FOREIGN PATENT DOCUMENTS

DE 19918736 A1 11/2000

(Continued)

OTHER PUBLICATIONS

C-130 (specific) Enlisted Aviation Warfare Specialist (EAWS) Tutorial, updated Jul. 2, 2000, accessed Mar. 23, 2009 through the Internet Archive at http://web.archive.org/web/20000917053606/http://members.tripod.com/~Motomom/C130 ; available online at least since Sep. 17, 2000, at 05:36:06 AM.*

(Continued)

*Primary Examiner*—Tien Dinh
*Assistant Examiner*—Richard R Green
(74) *Attorney, Agent, or Firm*—Wood, Herron & Evans, L.L.P.

(57) ABSTRACT

The invention relates to floor heating for an aircraft which has a floor (20) made up of heatable panels (18). In order to be able to heat up the panels (18) in an energy-saving way, the same are provided with hollow chambers (26) which pass through them, wherein a feed line (28) for warm waste air originating from the cooling of the aircraft's electronic equipment which is connected to the first hollow chambers (26), conveys hot air to the first hollow chambers (26) when the floor heating system is in operation.

22 Claims, 3 Drawing Sheets

U.S. PATENT DOCUMENTS

Figure 1:
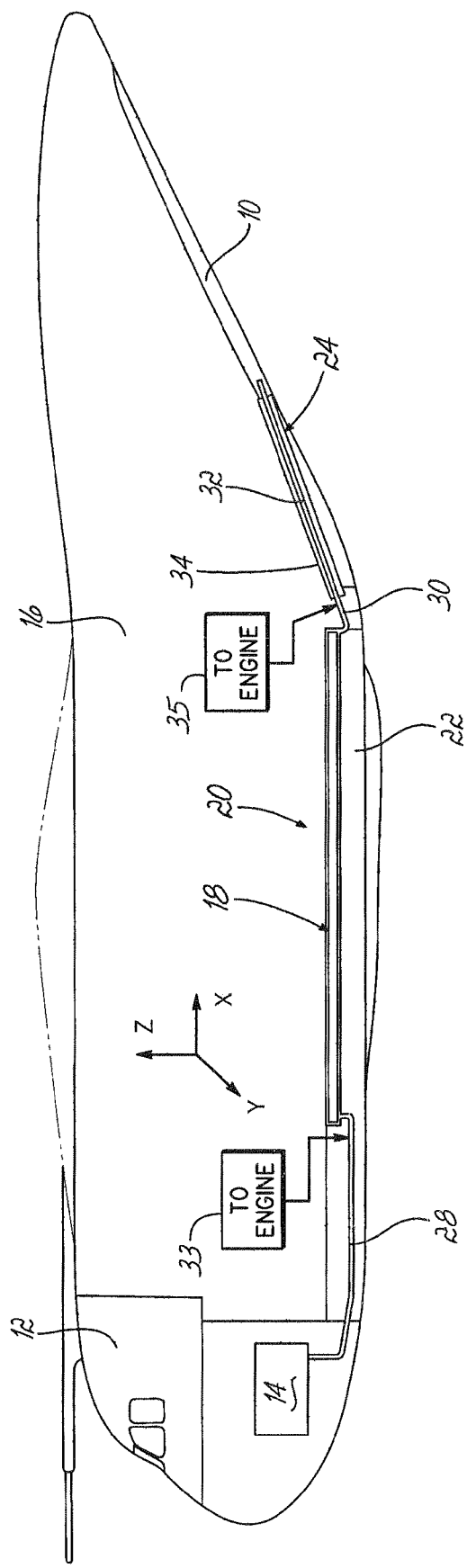

| | | | | |
|---|---|---|---|---|
| 3,203,473 | A * | 8/1965 | Goode et. al. | 165/296 |
| 3,981,466 | A * | 9/1976 | Shah | 244/134 R |
| 4,733,057 | A * | 3/1988 | Stanzel et al. | 219/548 |
| 4,819,720 | A * | 4/1989 | Howard | 165/56 |
| 5,701,755 | A * | 12/1997 | Severson et al. | 62/402 |
| 6,019,315 | A * | 2/2000 | Scherer et al. | 244/129.5 |
| 6,058,725 | A * | 5/2000 | Monfraix et al. | 62/172 |
| 6,311,106 | B1 * | 10/2001 | Dupont | 701/3 |
| 6,883,590 | B1 * | 4/2005 | Messana | 165/56 |
| 2002/0056787 | A1 * | 5/2002 | Wilson et al. | 244/118.5 |
| 2002/0168184 | A1 * | 11/2002 | Meisiek | 392/435 |

FOREIGN PATENT DOCUMENTS

| | | |
|---|---|---|
| GB | 954342 | 4/1964 |
| WO | WO01/17850 A1 | 3/2001 |

OTHER PUBLICATIONS

Forms PCT/ISA/210, 220, 237 International Search Report for PCT/EP2004/O14857, mailed on Mar. 23, 2005.

* cited by examiner

DEVICE AND METHOD FOR FLOOR HEATING IN AN AIRCRAFT

This invention relates to a device and a method for floor heating in an aircraft.

Owing to the direct contact between the floor and the aircraft structure, heat is lost from the cabin area to the outer skin. When the surrounding temperature is low, as is the case at the normal flight altitude of aircraft, or on the ground when the weather is cold, this heat loss means that the floor of the aircraft cools down. In a passenger aircraft, passengers can then easily get cold feet, and in a freight aircraft, ice can even form on the floor. In order to solve these problems, it is standard practice to heat the floor by means of electric heating mats. However, it is expensive to cover the entire floor surface, or at least a large section thereof with these heating mats, and in addition, during operation these heating mats require a considerable level of electrical power which has to be generated in the aircraft and so increases the aircraft fuel consumption.

The aim of the invention is to provide an improved solution for the heating of the floor of an aircraft, which solution, if possible, should be achieved without having to generate additional current.

This problem is solved according to the invention by a floor heating for an aircraft which has the features specified in patent claim 1 and by means of a method for the heating of the floor of an aircraft in accordance with patent claim 10.

The method according to the invention makes use of the fact that, nowadays, an extensive range of electronic equipment is provided in an aircraft which is cooled with air so as to guarantee correct function. This warm waste air which originates from the cooling of electronic equipment in the aircraft is available at next to no cost, and in accordance with the method proposed by the invention, it is conveyed through hollow chambers in panels which make up the aircraft floor. In this way the aircraft floor is used as a heat exchanger between the hot electronics waste air and the cold aircraft structure, whereby a temperature is achieved on the floor surface which is pleasant for passengers and which prevents the formation of ice on the floor in freight aircraft.

Preferably, the warm waste air is conveyed through the floor panels along the length of the aircraft, and particularly preferably in opposition to the flight direction. This makes it possible and easy to convey the warm waste air, after flowing through the hollow chambers in the panels which make up the floor, through the floor panels of the aircraft cargo hold door so that this can be heated up as well. In accordance with an example of the method proposed by the invention, the warm waste air flows out into the aircraft fuselage after having flowed through the floor panels of the cargo hold door. Alternatively of course, other means of disposing of the warm waste air used to heat the floor and the cargo hold door can be provided.

With a particularly preferred version of the method according to the invention, the warm waste air originates from what in the jargon of persons skilled in the art is often called the "avionics bay" of the aircraft, in which a large amount of the electronic equipment in an aircraft is kept. This type of avionics bay is usually located in the front section of an aircraft beneath the aircraft cockpit. Of course, according to the invention, any warm waste air which originates from the cooling of electronic components can be used in order to heat the floor and/or the cargo hold door. Depending on the circumstances, several supply lines are required to the floor and/or to the cargo hold door in order to convey the warm waste air from the different locations of electronic components to the floor and/or to the cargo hold door.

If the warm waste air which originates from the cooling of electronic equipment in the aircraft is not hot enough and/or is not available in sufficient quantities in order to heat the floor and/or the cargo hold door as required, it is proposed in accordance with a further development of the method according to the invention that the warm electronics waste air is mixed with hot engine bleed air. The hot engine bleed air is available in sufficient quantities. Preferably, the hot engine bleed air is mixed in before the warm electronics waste air is supplied to the hollow chambers of the floor.

With a slightly modified version of the method according to the invention, waste air which originates from the cooling of electronic equipment in the aircraft is mixed with hot engine bleed air at two points, one before the waste air is used to heat the floor, and the other before the waste air is used to heat the cargo hold door, if so after it has flowed through the floor. In this way, individual quantities of heat can be supplied to the floor and the cargo hold door.

As an alternative and/or in addition to the mixing in of hot engine bleed air, if the quantity of heat contained in the electronics waste air is insufficient for the required heating of the floor and/or the cargo hold door, the panels which make up the floor and/or the corresponding elements of the cargo hold door are provided with additional electric heating. In this way, the additional electric heating only produces the additional quantity of heat which is necessary for the required heating of the floor and/or the cargo hold door so that also this version of the method according to the invention is more economic with regard to energy than established, purely electrically-based solutions.

In accordance with a preferred version of the method according to the invention, a forced flow is generated in the panels of the floor or the cargo hold door, for example by means of ventilators or similar, in order to improve and even out the heat transfer.

The floor heating for an aircraft according to the invention includes continuous first hollow chambers which are formed within panels which make up the aircraft floor. Associated with the first hollow chambers is a feed line for warm waste air which originates from the cooling of electronic equipment in the aircraft. In this way, the aforementioned warm air can be used specifically for heating the aircraft floor.

Preferably, the first hollow chambers in the panels extend along the length of the aircraft. The warm waste air can then flow through the floor counter to the flight direction, and can at the end of the cargo hold or the aircraft cabin be used for the heating of still other parts. To this end, in accordance with another version of the floor heating according to the invention, the first hollow chambers are in flow connection with second hollow chambers which are provided in floor panels of the aircraft cargo hold door. After flowing through the first hollow chambers, and at the same time heating up the floor, the warm waste air can then flow through the second hollow chambers of the cargo hold door in order to heat up the latter as well. The second hollow chambers can lead out freely into the aircraft fuselage, but separate outlet lines can also be provided for the waste air from the second hollow chambers.

With preferred versions of the floor heating according to the invention, the feed line associated with the first hollow chambers serves to join the first hollow chambers with the previously mentioned avionics bay of the aircraft. If warm waste air from the cooling of electronic equipment is to be conveyed from another point or from several points in the aircraft to the first hollow chambers, the feed line must be in flow connection with this point or these points. Several separate feed lines can also be used which each convey warm electronics waste air from the location point of the electronic equipment to the first hollow chambers.

In accordance with a further development of the floor heating according to the invention, an additional feed line is provided which connects the first hollow chambers with hot engine bleed air. If the available electronics waste air is not sufficient, either with regard to quantity and/or temperature, additional warm air from another source, and which is available in sufficient quantities, can thereby be supplemented to the first hollow chambers. If so required, the hot engine bleed air can also heat the floor and/or the cargo hold door without any electronics waste air. Advantageously, the additional feed line is positioned in such a way that the hot engine bleed air can be mixed with the waste air originating from the cooling of electronic equipment in the aircraft before entering into the first hollow chambers. If required or desired, the feed lines can contain regulation valves which, in conjunction with the temperature sensors, set a pre-specified mix temperature with which the mix of electronics waste air and hot engine bleed air flows into the first hollow chambers.

Alternatively, hot engine bleed air can be mixed at several points with the warm waste air originating from the cooling of electronic equipment in the aircraft, e.g., before the waste air enters into the first hollow chambers and moreover, once again before the waste air enters into the second hollow chambers. A simple possibility for quantity regulation of the mixed engine bleed air is to choose the corresponding flow cross-section of the supply line or feed line with which the hot engine bleed air is conveyed to the mixing point in such a way that the maximum quantity of heat which can flow through this line is the required quantity.

By means of two or more points for mixing in hot engine bleed air, the temperature, for example of the floor and the cargo hold door, can be individually set.

Alternatively, if the warm electronics waste air is not sufficient for the heating of the floor and/or the cargo hold door, additional electric heating can be provided to the panels which make up the floor and/or the cargo hold door. This additional electric heating can be provided, for example, by means of conventional electric heating mats which are positioned on the upper side and/or the lower side of the panels which make up the floor. If the upper side of the floor needs to be heavy duty, the electric heating mats are preferably only placed on the lower side of the panels.

In accordance with yet another alternative, additional electric heating can also be provided by means of electric heating coils or heating wires integrated into the hollow chambers of the floor and the cargo hold door. This embodiment can be used as an alternative to or in addition to the aforementioned additional heating by means of electric heating mats.

Even if additional electric heating is provided, corresponding to the aforementioned alternatives, the floor heating according to the invention is still more economical than conventional heating using only electric heating mats because, according to the invention, only that portion of heat needs to be generated electrically that may be required in addition to the heat which has already been provided in the electronics waste air.

In order to improve and even out the transfer of heat, in accordance with a preferred version of the floor heating according to the invention, ventilators are positioned in the hollow chambers of the floor and/or the cargo hold, and these generate a forced flow of warm air through the hollow chambers.

In order to increase the efficacy of the floor heating according to the invention, the panels which make up the floor are preferably thermally uncoupled from any structure which supports the floor so as to minimize heat loss from the panels to the structure. In order to further increase effectiveness, the panels are provided with thermal insulation on their lower side at points where they are not in contact with the structure which supports the floor. This thermal insulation can, for example, be in the form of panels or mats, and be made from a material which is generally familiar to experts in this field for this specific purpose. For the thermal uncoupling of the panels from the structure which supports the floor however, a layer of rigid insulation material is preferably chosen so that the load capacity of the floor is not negatively affected.

With all of the examples of the floor heating according to the invention, the panels which make up the floor are preferably profile members produced by extrusion, in particular by continuous extrusion. In these profile members, the hollow chambers required for conveying the warm waste air are cost effectively produced as part of the extrusion process.

Figure 2:
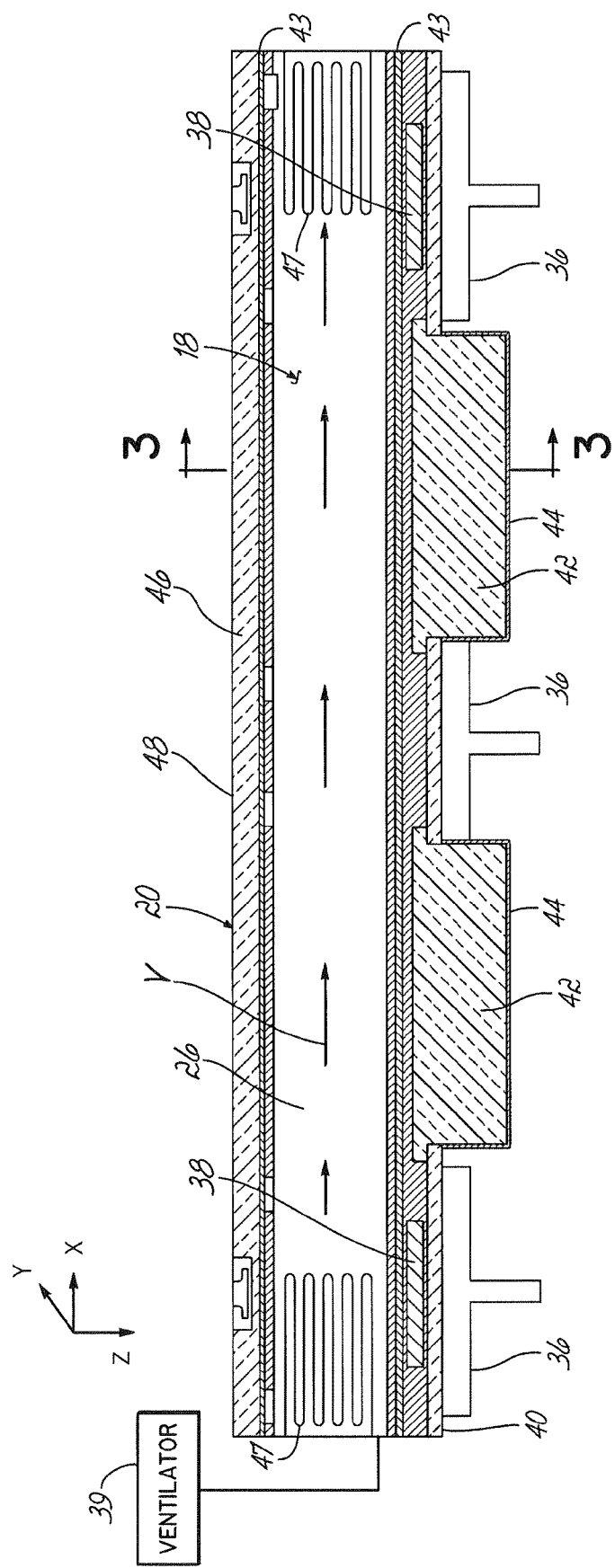
Figure 3:
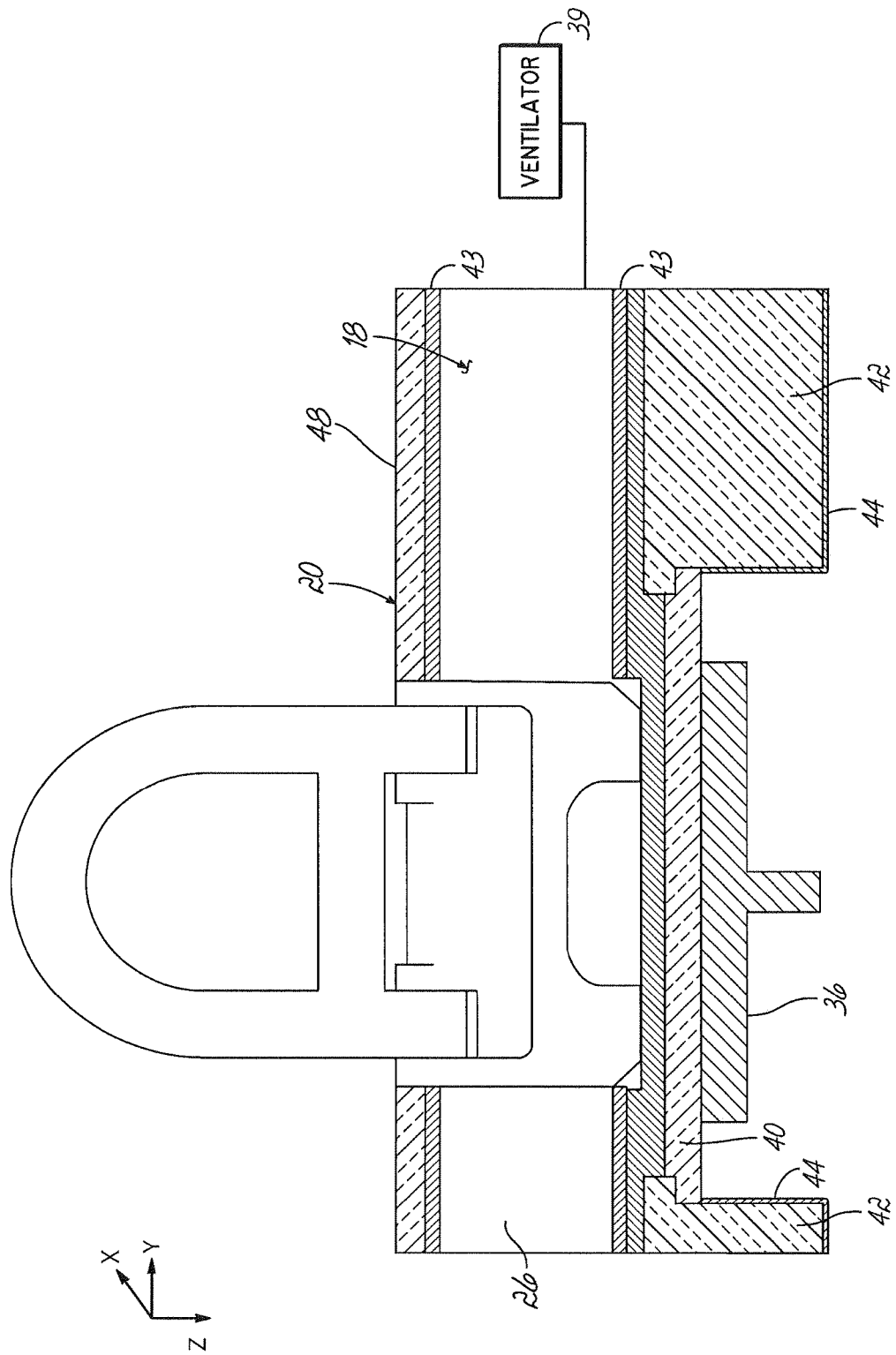

In the following, an example of the invention is described in greater detail, with reference to the attached schematic figures, wherein FIG. 1 shows a schematic, partially cut away side view of a freight aircraft, FIG. 2 shows a longitudinal section through a portion of a floor system which separates the cargo hold from the bilge of the aircraft, and FIG. 3 shows a cross-section through the floor system from FIG. 2.

FIG. 1 schematically illustrates the fuselage 10 of a freight aircraft. At the front end of the fuselage 10 there is a cockpit section 12, below which there is an avionics bay 14 in which a large amount of the electronic equipment for the aircraft is kept. The term "electronic equipment" here means, for example, electronic equipment which is required for the navigation of the aircraft and also for the control of a number of components in the aircraft.

Along the length of the aircraft, behind the cockpit 12 and the avionics bay 14, there is a cargo hold 16 which takes up the largest part of the fuselage 10. The cargo hold 16 has a floor 20 made up from panels 18 which separates the cargo hold 16 from a bilge 22 located underneath the floor 20.

In the rear, lower section of the fuselage 10, there is a cargo hold hatch or door 24 which is shown in FIG. 1 in closed position, and which in open position serves as a ramp by means of which the cargo hold 16 can be reached from outside.

As is more clearly visible in FIGS. 2 and 3, the panels 18 are extruded profile members in which the first hollow chambers 26 extend along the whole length of the floor 20. Generally these profile elements are made from an aluminium alloy.

A feed line 28 extends between the front end of the panels 18 (as seen in the direction of flight) and the avionics bay 14, by means of which the warm waste air used to cool the electronic equipment in the avionics bay 14 can be conveyed to the first hollow chambers 26. A distributor, not shown in the figures, ensures that there is even distribution of warm waste air to all of the first hollow chambers 26 of the panels 18.

Via a connection line 30, the first hollow chambers 26 of the panels 18 are in flow connection with the second hollow chambers 32 which are provided in the floor panels 34 of the cargo hold door 24. The floor panels 34 are extruded profile elements similar to the panels 18 of the floor 20. The second hollow chambers 32 in the example illustrated end into the aircraft fuselage 10. FIG. 1 shows feed lines 33 and 35, respectively, for connecting the first and second hollow chambers 26, 32 to the engine for receiving hot bleed air.

The panels 18 of the floor 20 are fastened in a way not shown by their lower side onto supports 36 which are part of a structure which supports the floor 20. The position of the supports 36 generally corresponds to the position of seat track adapters 38 which extend cross-wise to the boards 18 and by means of which seats can be fastened to the floor 20. For the thermal uncoupling of the panels 18 from the supports 36, between the lower side of the boards 18 and the upper side of each support 26 exposed to the latter, a layer 40 of rigid insulation material is positioned. The term "rigid insulation material" here means an insulation material which is not, or at least not noticeably compressed when subjected to pressure. It does not, therefore, affect the loading capacity of the floor 20.

In the areas between the supports 36, a layer of insulation material 42 is applied to the lower side of the panels 18 which is considerably thicker than the layer 40 of rigid insulation material. The insulation material 42 does not need to be rigid because it does not have to withstand pressure. The insulation material 42 can, for example, be elements made from polyurethane foam or any other foam suitable for heat insulation which are stuck onto the panels 18. It is also possible to incorporate the layer of insulation material 42 with the panels 18 during the extrusion process so that it forms one part with the panels 18, for example by means of co-extrusion. In order to further improve the insulation properties of the layer of insulation material 42, the outer side of the insulation material 42 which is not in contact with the panels 18 can be covered with a layer 44 of highly reflective material. If desired, as shown in FIG. 2, conventional electrical heating mat 43 can also be positioned above or below the panel hollow chambers 26. Furthermore, electrical heating coils or wires 47 can be placed within the hollow chambers 26 to deliver more heat to the flow of waste air.

On the upper side of the panels 18 there is an insulation layer 46 on which a covering panel 48 which forms the actual walk-on surface of the floor 20 is positioned. A carpet can be fixed onto the covering panel 48 if so required. In the following, the function of the heatable floor system is described. In order to cool the electronic equipment housed in the avionics bay 14, generally by means of a blower, air is injected into the avionics bay 14. The air takes heat from the electronic equipment and flows as warm waste air through the feed line 28 into the first hollow chambers 26 of the panels 18 of the floor 20. In the first hollow chambers 26, the warm waste air flows lengthwise and against the direction of flight through the whole floor 20 (see the arrow v which symbolises the flow in FIG. 2).

At the end of the floor 20 a member which is not illustrated collects the air emerging from the first hollow chambers 26 and passes it on to a connection line 30 from which the air flows into the second hollow chambers 32, if so required by means of a second distributor, not illustrated here, which are incorporated into the floor panels 34 of the cargo hold door 24. At the end of the second hollow chambers 32 the now cooled down air flows out into the aircraft fuselage 10. Alternatively, this air can be conveyed to the outside in a controlled manner.

As is clear from the above functional description, both the floor 20 and the floor panels 34 of the cargo hold door 24 are heated to a pleasant temperature by the warm electronics waste air. If the electronics waste air available is insufficient with regard to temperature and quantity for the heating of the floor 20 and/or the floor panels 34, hot engine bleed air can be admixed. If desired, as shown schematically in FIG. 3, a ventilator 39 may be used to generate a forced flow through the first hollow chambers 26.

The invention claimed is:

1. Aircraft floor heating comprising:
   an aircraft with a fuselage having a forward cockpit section and a cabin section located aft of the cockpit section and extending along the length of the aircraft, the cockpit section including a cockpit and an avionics bay containing electronic equipment;
   a floor within the cabin section made up of heatable panels defining a plurality of first hollow chambers formed integrally with the panels and wherein each hollow chamber has a first end proximate to the cockpit section and a second end distal of the cockpit section; and
   a feed line operatively connected to the avionics bay and the first ends of the first hollow chambers and providing fluid communication therebetween, the feed line supplying warm waste air to the first ends of the hollow chambers, the warm waste air having originated from the cooling of the electronic equipment contained in the avionics bay, whereby the warm waste air travels through the first hollow chambers along the fuselage of the aircraft and heats the floor of the cabin section,
   a cargo door located in the fuselage aft of the first hollow chambers, the cargo door including heatable panels defining a plurality of second hollow chambers formed integrally with the panels, the second hollow chambers residing in fluid communication with the second ends of the first hollow chambers,
   the second hollow chambers being in fluid communication with one of (a) the cabin section, and (b) the outside of the aircraft, whereby warm waste air flows from the second hollow chambers to one of the cabin section and the outside of the aircraft.

2. Floor heating in accordance with claim 1, characterized in that the first hollow chambers extend in the longitudinal direction of the aircraft inside the panels.

3. Floor heating in accordance with claim 1, characterized in that the second hollow chambers terminate into the cabin section aft of the cargo door.

4. Floor heating in accordance with claim 1, further comprising:
   a first bleed air feed line operatively connecting the first ends of the first hollow chambers to a first supply of hot bleed air from the engine of the aircraft.

5. Floor heating in accordance with claim 4, further comprising:
   a second bleed air feed line operatively connecting the second hollow chambers to a second supply of hot bleed air from the engine of the aircraft.

6. Floor heating in accordance with claim 5, characterized in that the cross sections of the first and second bleed air feed lines determine the amount of hot engine bleed air supplied.

7. Floor heating in accordance with claim 1, characterized in that the panels are thermally uncoupled from a structure which supports the floor.

8. Floor heating in accordance with claim 1, further comprising:
   electric heating mats for supplementary heating of the panels.

9. Floor heating in accordance with claim 8, characterized in that the electric heating mats are positioned on the lower side of the panels.

10. Floor heating in accordance with claim 1, further comprising:
    electric heating coils or wires integrated into the first hollow chambers for supplying supplementary heating therein.

11. Floor heating in accordance with claim 1, further comprising:
ventilators positioned in the first hollow chambers to generate a forced flow through the first hollow chambers.

12. Floor heating in accordance with claim 1, further comprising:
thermal insulation located on a lower side of the panels.

13. Floor heating in accordance with claim 1, characterized in that the panels are profile elements produced by continuous extrusion.

14. Floor heating in accordance with claim 1, wherein the floor of the cabin section is flat and substantially horizontal.

15. Method for heating the floor of an aircraft having a forward cockpit section and a cabin section located aft of the cockpit section and extending along the length of the aircraft, the cockpit section including a cockpit and an avionics bay containing electronic equipment, wherein the aircraft includes a cargo door formed with panels, the method comprising:
conveying air over the electronic equipment in the avionics bay to cool the electronic equipment and to warm the conveyed air, thereby to form warm waste air;
conveying the warm waste air aftwardly from the cockpit section to a plurality of first hollow chambers that reside below a floor of the cabin section, the first hollow chambers having first ends in fluid communication with the cockpit section and second ends located aft of the first ends thereby to heat the floor of the cabin section
maintaining fluid isolation between the warm waste air conveyed in the first hollow chambers and the cabin section of the aircraft between the first ends and the second ends of the first hollow chambers;
conveying the warm waste air, after having flowed though the first hollow chambers, through a plurality of second hollow chambers defined by the panels in the cargo door; and
venting, via the second hollow chambers, the warm waste air to one of (a) the cabin section and (b) the outside of the aircraft.

16. Method in accordance with claim 15, characterized in that the warm waste air is conveyed through the first hollow chambers in the longitudinal direction of the aircraft and counter to the flight direction.

17. Method in accordance with claim 15, further comprising:
conveying the warm waste air into the cabin section after having flowed through the panels of the cargo door.

18. Method in accordance with claim 15, further comprising:
mixing hot bleed air from the engine with the warm waste air thereby to create a mixture, the mixture being conveyed to the first hollow chambers.

19. Method in accordance with claim 15, further comprising:
mixing hot bleed air from the engine with the warm waste air thereby to create a first mixture, the first mixture being conveyed to the first ends of the first hollow chambers, and
thereafter, downstream of the first hollow chambers, mixing additional hot bleed air from the engine with the first mixture to create a second mixture, the second mixture being conveyed to the second hollow chambers in the panels of the cargo door.

20. Method in accordance with claim 15, characterized in that the floor of the cabin section is additionally heated by electricity.

21. Method in accordance with claim 15, characterized in that a forced flow is generated in the first hollow chambers.

22. Method in accordance with claim 15, wherein the floor of the cabin section is flat and substantially horizontal.

* * * * *